Patented Mar. 25, 1941

2,235,955

UNITED STATES PATENT OFFICE 2,235,955

ADDITION AGENT FOR ENHANCEMENT OF THE PROPERTIES OF DRILLING MUDS

Milton Williams, Houston, Tex., assignor to Standard Oil Development Company, a corporation of Delaware No Drawing. Application September 21, 1937, Serial No. 164,870

25 Claims. (Cl. 255—1)

This invention is directed to new complex water soluble, phosphate glasses, a method for making them and methods in which they can be utilized.

The glasses prepared by the method of the present invention are useful in a great many arts. In general, they are excellent conditioners for hard water, are useful in the prevention of boiler scale and in its removal from boilers, are satisfactory dispersing agents for use in the purification of ceramic clays, are useful ingredients of scouring powders for washing greasy articles, are suitable for use as buffer salts, and are excellent addition agents for drilling muds. It is with relation to this last use that they are hereinafter more specifically described.

A drilling fluid is a system comprising three main constituents; namely, water, colloidal matter, consisting of both gel forming and non-gel forming types of colloids, and large particles suspended in the water. A typical mud fluid may weigh from 8–18 lbs./gallon. Of the two types of colloids present, the gel forming type is definitely the more important, for this group imparts the necessary properties of an efficient drilling fluid, that is, stability of suspension, thixotropy, viscosity, pore sealing, and gel characteristics in general. Colloids of the non-gelling type, together with the larger particles, contribute somewhat to viscosity but more particularly to the density of a drilling fluid. It is generally desirable in drilling practice to maintain the viscosity below about 25 centipoises as measured by the Stormer viscosimeter at 10 revolutions per second.

The general principles of the rotary drilling method have been described in various patents; for example, the U. S. patent to Lawton, Loomis, and Ambrose, No. 1,999,766, dated April 30, 1935. Likewise, the desirable properties of a drilling mud which must be controlled during the course of rotary drilling include the density, viscosity, gel strength, and sand content. The density must be maintained sufficiently high so that the hydrostatic head of the column of mud in the bore hole is greater than the pressure of the fluids contained in the porous formations penetrated by the borehole. The viscosity and gel strength of the mud must be controlled within reasonable limits in order that the mud can perform satisfactorily its functions of removing rock cuttings from the well, releasing these cuttings at the surface of the earth, lubricating the bits, preventing caving of loose formations, and preventing the settling of cuttings in the well when mud circulation is discontinued.

One of the most important operations in treating a drilling mud involves the reduction of gel strength and viscosity of the mud. This type of treatment results in reducing the load on the pump which circulates the mud and thereby permits the pump to handle more fluid, thereby permitting faster drilling of the bore hole. Also, rock cuttings are permitted to settle out of the mud relatively rapidly, reducing abrasion on the machinery of the circulating system of the mud. Similarly, the tendency of the mud to entrain gas is reduced. Many advantages of a mud of the proper viscosity and gel strength will be apparent to those skilled in the art of drilling wells.

Many of the drilling troubles which are experienced are directly attributable to muds of excessive viscosity. The most usual cause of excessive viscosity in Gulf Coast muds in the United States at certain depths is due to the quantity of colloidal materials in the natural mud and to an excessive concentration of calcium compounds. In drilling wells for oil or gas, it is often necessary to sink the wells to a depth of several thousand feet, wells more than 10,000 feet deep being not at all uncommon. At these and even more shallow depths, formation temperatures may exceed 200° F. It has been found that increases in temperature cause the viscosity and gelation of drilling mud to increase. It has also been found that the common dispersing agents which have been used to reduce the viscosity and gel strength of drilling muds give very temporary effects at high temperatures, and in some cases, if a mud is treated with an agent for reducing the viscosity, the viscosity of the sample after subjection to a high temperature, i. e., 200° F., will be higher than it was originally.

I have discovered that the viscosity and gelation of a drilling mud can be effectively reduced and maintained at approximately the same reduced value even after the mud is subjected to high temperatures for long periods of time, by the addition of a complex, the formation and use of which is described in subsequent paragraphs.

In general the water soluble glasses of the present invention are prepared by dissolving in a phosphate melt an oxygen containing compound of an element of groups 2–8 of the periodic system whose oxide is soluble in the melt, and, after solution is complete, quickly cooling the melt to solidification. The best results are obtained when the oxygen containing compound is one of an element whose oxide is acidic. The compound employed may be an oxide or carbonate or other oxygen containing salt of the element which is convertible into the oxide of the element by heating, or it may be an alkali metal or an alkaline earth metal compound of the acid of the element. The oxygen containing compound must, of course, be one of an element the oxide of which is normally a solid.

It is not intended that nitrogen pentoxide, which is normally solid, be embraced within the group of oxygen containing compounds which may be employed. To this end the oxygen containing compound may be defined as being one of a normally solid element selected from groups 2–8 of the periodic system having a normally solid oxide.

In the manufacture of these glasses the oxygen containing compound above referred to, when it is an oxide, is usually combined with any alkali metal phosphate. The combining proportions may vary within wide ranges. For this reason the ratio of alkali metal to phosphorus to metal from groups 2 to 8 of the periodic system may be varied at will by the addition to the melt of alkali metal, oxide and/or phosphorus pentoxide. Indeed, it is possible to make a soluble glass by fusing an alkali metal oxide (which will ordinarily be used in the form of its hydroxide), phosphorus pentoxide and an oxide of a metal of groups 2–8 as defined above. There are operating difficulties with such materials, however, and the products formed are not as suitable for mud treating purposes as those obtained by dissolving the oxygen containing compound of the metal from groups 2–8 in an alkali metal phosphate melt.

It is preferred to use such a compound of phosphorus as will give in the final product a molecular ratio of alkali metal to phosphorus of 1–1. This may be accomplished by employing as a phosphate constituent, monosodium phosphate, sodium metaphosphate or a polymeric derivative thereof such as sodium hexametaphosphate in conjunction with an oxide of an element of groups 2–8 of the periodic system as heretofore described. If the oxygen containing compound of the element from groups 2–8 is an alkali metal salt of the acid of such an element, the phosphate employed may be one having an alkali metal to phosphorus ratio of less than one to one.

Among the best agents are those containing a phosphate radical, an alkali metal and one of silicon, boron vanadium, tungsten, molybdenum, chromium and uranium. The preferred complexes of this group are those obtained by dissolving an oxide of one of the named elements in a melt of monosodium phosphate or sodium hexametaphosphate, complete solution being followed by quick chilling.

The amount of compound of the element from groups 2–8 of the periodic system added to the phosphate melt may vary within wide ranges. A safe guide as to the maximum quantity that may be added is the natural limit imposed by the solubility of the oxide in the alkali metal phosphate melt. At least 1%, by weight, of the metal oxide should be employed. Preferably, the amount of the compound of the element from groups 2–8 should vary between 2% and 10%, by weight, of the phosphate melt, the percentage being based on the weight of the oxide of the element. An excess of the compound of this element over its combining weight with the phosphate may be used without disadvantage. The combining weight may be determined by a few experiments in which the oxide of the element is melted with the phosphate. Any excess oxide employed will be less soluble in water than the complex and can be readily separated from the melt by dissolving the latter in water. The oxygen containing compound may be mixed with the phosphate before the latter is melted or may be added to the melt in one dose or gradually in several doses.

Solution of the added oxygen-containing compound in the phosphate melt is usually obtainable at about red heat although in some cases it is necessary to heat the melt to 1000° C. in order to obtain a clear melt.

The chilling of the melt should be accomplished in less than about four minutes; preferably in less than a minute. This may be accomplished by pouring the melt in a thin layer on a water cooled plate or drum.

The glasses produced according to the present invention appear to be true compounds. Evidence in support of this conclusion is that some of the melts have a characteristic color or have water solutions of a characteristic color. For example, the melt prepared from vanadium pentoxide and sodium hexametaphosphate is dark brown and transparent and gives a green water solution. The melt prepared from yellow uranium oxide and sodium hexametaphosphate is an emerald green which gives a green water solution. The melt prepared from white molybdic oxide and sodium hexametaphosphate is an emerald green and gives a blood red solution in water. A similar melt prepared from chromic oxide is also emerald green and gives a green water solution. The melt prepared from ferric oxide is colorless and has a colorless water solution. This solution does not respond to the ammonium thiocyanate test for iron.

The drilling muds which may be treated with the complex phosphate glasses of the present invention may be aqueous dispersions of the natural clay formations encountered in drilling any type of well. The drilling mud may be prepared from surface clays, bentonite clays of the Aquagel type, or the like. The clays may contain weighting materials, such as barytes, iron oxide, litharge, or the natural shales or other mineral matter picked up during the drilling operations. The complex phosphate-oxide material will reduce the viscosity of mixtures of silica and water and barytes and water.

Ordinarily, the treatment is made by adding aqueous solutions of complex phosphate-oxide material to the mud as it flows around the ditch at the surface of the earth in the circulating system of the well. This is the preferred procedure since these glasses, while they are soluble in water, have a slow rate of solubility sometimes requiring several hours in order to make a 5% solution. It is, therefore, desirable to use preformed solutions. However, the material can be added in its solid form, or the material can be mixed with clays or weighting materials prior to adding it to the mud. Preferably, a small percentage by weight of the complex alkali phosphate-oxide material is added to the mud; additions of amounts varying from traces up to 5% (by weight) of the complex to the mud are contemplated.

Examples of the use of these compounds to reduce the viscosity of a drilling mud follow.

In these examples the unit of viscosity is, unless designated as centipoises, the driving weight in grams required to sustain a velocity of 600 revolutions per minute on the Stormer viscosimeter. The driving weight is a measure of viscosity and serves as a basis of comparison.

*Example I*

Silica was prepared by adding ethyl silicate to dilute HCl, decanting the liquid and igniting the residue. Sodium hexametaphosphate was melted in a crucible maintained at red heat and silica was added gradually. After the silica dissolved, the crucible was immersed in water while still at red heat. A transparent glass was formed which dissolved in sufficient water to make a 5% to 10% solution.

The weight of the silica was about 5% to 10% of the weight of the hexametaphosphate. The combining weight of the silica with the phosphate is assumed to be between 5% and 10%. Any excess silica employed does not dissolve in water and may be separated from the melt by dissolving the latter in water.

One sample of mud from the Dickinson field, located in Galveston County, Texas, had an original viscosity of 119 grams at 600 revolutions per minute. When this sample was treated with 1 cc. of a 5% solution of the complex phosphate-$SiO_2$ material, to each 200 cc. of mud, the viscosity was reduced to 81 grams at 600 revolutions per minute. This sample was then heated to 82 deg. C. for 42 hours, and at the end of this time, its viscosity was 88 grams at 600 revolutions per minute. To demonstrate the superiority of this complex material over previous agents which have been used for the same purpose, a sample of the Dickinson mud cited above was treated with a 5% solution of sodium hexametaphosphate at a concentration of 1 cc. of treating agent to 200 cc. of mud. The viscosity of this sample was reduced from 119 grams to 94 grams. When the sample was heated for 42 hours at a temperature of 82 deg. C., the viscosity increased to 118 grams.

As an example of the reduction in gel strength obtainable by the use of these reagents, the following may be cited. The gel strengths were determined by measuring the viscosity of the muds at several rates of shear, for example 50, 100, 200, 300, 400, 500 and 600 revolutions per minute. By plotting rates of shear against driving force and extrapolating the curve to zero rate of shear, the curve will cross the driving force axis at some point other than zero. This value is called the yield point of the mud and is the force required to overcome gelation. A sample of untreated mud from the Amelia Field, Jefferson County, Texas, was found to have a yield value of 53 grams. After treatment with 1 cc. of the complex silica-phosphate complex (5% solution) to each 200 cc's. formed, the yield value of a sample of mud was 19 grams.

Another example of the utility of these complex phosphate-oxide materials is shown by their effectiveness in settling sand from clay suspensions. Sand (80-100 mesh) was added to a sample of Amelia mud in the ratio of 1 gram of sand to 1 gram of mud. A sample of this mixture was then stirred rapidly until a thorough mixture was obtained. A 100 cc. graduate was then filled with this mud and allowed to remain undisturbed for five minutes. The upper 5 cc. of mud was then withdrawn, and it was found to contain 50% (by volume) sand. Another sample of this mud was treated with a 5% solution of the complex phosphate-silica material (1 cc. of treating agent to 100 cc. of mud) and when allowed to stand undisturbed for five minutes in a 100 cc. graduate, the top 5 cc. portion contained 4% sand.

*Example II*

300 grams of $NaH_2PO_4H_2O$ were mixed with 15 grams of Silox and put into a plumbago crucible which was placed in a muffle furnace. The temperature of the furnace was brought to 900° C. over a period of 5 hours. The crucible was then heated for an additional hour at 1000°. The melt was poured on to a cold tray and solidified to a transparent glass. This glass when dissolved in water had the same properties described in Example I.

By comparison with sodium hexametaphosphate the glass had the following mud treating properties:

An oil well mud was evaporated down to give a viscosity of 145 grams at 600 R. P. M. (44 centipoises). Duplicate 200 cc. samples of this mud were treated with 1 cc. of a 5% solution of the sodium hexametaphosphate and the silica-phosphate glass respectively. The hexametaphosphate reduced the viscosity of the mud to 19 centipoises. The silica-phosphate glass reduced the viscosity of the mud to 16 centipoises.

These samples were then placed in a steam chest maintained at 60° C. for 18 hours. The hexametaphosphate treated sample then had a viscosity of 29 centipoises. The silica-phosphate treated mud then had a viscosity of 23 centipoises. After a further 24 hours in the steam chest the first sample had a viscosity, at 600 R. P. M., of 34 centipoises, while the second sample had a viscosity, at 600 R. P. M., of 25 centipoises.

After another 20 hours in the steam chest the first sample had a viscosity, at 600 R. P. M., of 36 centipoises while the second sample had a viscosity, at 600 R. P. M., of 26 centipoises. 72 more hours in the steam chest increased the viscosity of the first sample at 600 R. P. M., to 45 centipoises, and that of the second sample, at 600 R. P. M., to 34 centipoises.

*Example III*

About 1 part (by weight) of $Al_2O_3$ was fused with about 35 parts (by weight) of sodium hexametaphosphate until a clear melt was obtained. The melt was chilled rapidly to a transparent glass and dissolved in water to form a 5% solution. 1 cc. of this solution reduced the viscosity of a drilling mud from 38 centipoises to 17 centipoises at 600 R. P. M.

*Example IV*

About 1 part (by weight) of molybdic oxide was fused with about 20 parts (by weight) of sodium hexametaphosphate. Solution occurred with considerable frothing. When solution was complete the melt was chilled rapidly to form a transparent emerald green glass. This glass dissolved in water to form a blood red solution. 1.5 cc. of a 5% solution of this glass reduced the viscosity of 300 cc. of a drilling mud from 33 centipoises to 18 centipoises at 600 R. P. M.

*Example V*

1 part (by weight) of chromic oxide was fused with about 20 parts (by weight) of sodium hexametaphosphate. Fusion was continued until a clear solution was obtained. This solution was chilled rapidly to form a transparent emerald green glass, which dissolved in water to give a green solution. 1.5 cc. of a 5% solution of this glass reduced the viscosity of 300 cc. of a drilling mud from 33 centipoises to 20 centipoises at 600 R. P. M.

Example VI

5% (by weight) of uranium oxide was fused to a clear solution with sodium hexametaphosphate. The melt was chilled rapidly to form an emerald green transparent glass. 1.25 cc. of a 5% solution of this glass reduced the viscosity of 250 cc. of drilling mud from 47 centipoises to 20 centipoises at 600 R. P. M. The same amount of the glass described in the preceding example reduced the viscosity of the same quantity of this mud, at 600 R. P. M., to 18 centipoises. The same quantity of glass described in Example IV reduced the viscosity of the same amount of this mud at 600 R. P. M., to 15 centipoises.

Example VII

5% (by weight) of tungstic oxide was dissolved in a melt of sodium hexametaphosphate, heating being continued until a clear solution was obtained. This solution was immediately chilled to a transparent colorless glass which dissolved in water to form a colorless solution. 1.25 cc. of a 5% solution of this glass reduced the viscosity of 250 cc. of a drilling mud from 47 centipoises to 17 centipoises at 600 R. P. M.

Example VIII

About 6% (by weight) of vanadium pentoxide was dissolved in a melt of sodium hexametaphosphate; heating being continued until a clear solution was obtained. The solution was quickly chilled to a dark brown transparent glass, which dissolved in water to give a green solution. 1 cc. of a 5% solution of this glass reduced the viscosity of 200 cc. of a drilling mud from 47 centipoises to 13 centipoises at 600 R. P. M.

Example IX

About 4% (by weight) of thoria was dissolved in a melt of sodium-hexametaphosphate. The melt was quickly chilled to form a transparent glass. 1 cc. of a 5% solution of this glass reduced the viscosity of the mud described in the preceding example to 16 centipoises at 600 R. P. M.

As mentioned in preceding paragraphs, mud fluids contain colloidal matter consisting of both gel forming and non-gel forming types. The colloidal material in most formations encountered in the Gulf Coast area of the United States consists chiefly of the gel forming type and this type of material not only causes high gelation, but high viscosity as well. The maximum density of the mud fluids which are suitable for drilling purposes and prepared from the formation material encountered as the well is drilled is limited in most cases to 1.2. By using the complex phosphate glasses of the present invention in the mud, the density can be increased to 1.3 without any appreciable change in viscosity by allowing more of the formation material to concentrate in the mud.

Although the above discussion has been confined to controlling the properties of clay suspensions, this material may also be used to disperse suspensions of other types of mineral matter, such as silica, barytes, and iron oxide.

The nature and objects of the present invention having thus been described and illustrated by specific examples, which are only illustrated, what is claimed as new and useful and is desired to be secured by Letters Patent is:

1. The method of improving a drilling mud which comprises adding thereto a water soluble glass containing a phosphate radical and a normally solid element, in compounded form, other than phosphorus, of groups 2–8 of the periodic system having a normally solid oxide.

2. The method of improving a drilling mud which comprises adding thereto a water soluble glass containing a phosphate radical, an alkali metal in compounded form, and a normally solid element, in compounded form, other than phosphorus, of groups 2–8 of the periodic system having a normally solid oxide.

3. The method of improving a drilling mud which comprises adding thereto a water soluble glass resulting from fusing an alkali metal phosphate and an oxygen containing compound of a normally solid element, other than phosphorus, of groups 2–8 of the periodic system having a normally solid oxide, and rapidly chilling the melt.

4. The method of improving a drilling mud which comprises adding thereto a water soluble glass containing a phosphate radical and a normally solid element, in compounded form, other than phosphorus, of groups 2–8 of the periodic system having a normally solid acidic oxide.

5. The method of improving a drilling mud which comprises adding thereto a water soluble glass containing a phosphate radical, an alkali metal, in compounded form, and a normally solid element, in compounded form, other than phosphorus, of groups 2–8 of the periodic system having a normally solid oxide, the alkali metal and the phosphorus being present in said glass in a molecular ratio of 1:1.

6. The method of improving a drilling mud which comprises adding thereto a water soluble glass resulting from fusing an alkali metal phosphate and an oxygen containing compound of a normally solid element, other than phosphorus, of groups 2–8 of the periodic system having a normally solid acid oxide, and rapidly chilling the melt.

7. The method of improving a drilling mud which comprises adding thereto a water soluble glass comprising an alkali metal hexametaphosphate, homogeneously associated with an oxygen containing compound of a normally solid element, other than phosphorus, of groups 2–8 of the periodic system having a normally solid oxide.

8. A drilling mud comprising a clay suspension containing in solution a water-soluble glass containing a phosphate radical and a normally solid element, in compounded form, other than phosphorus, of groups 2–8 of the periodic system having a normally solid oxide.

9. A drilling mud comprising a suspension of clay containing in solution a water-soluble glass containing a phosphate radical, an alkali metal in compounded form, and a normally solid element, in compounded form, other than phosphorus, of groups 2–8 of the periodic system having a normally solid oxide.

10. A drilling mud comprising a suspension of clay containing in solution a water-soluble glass containing a phosphate radical and a normally solid element, in compounded form, other than phosphorus, of groups 2–8 of the periodic system having a normally solid acidic oxide.

11. A drilling mud comprising a suspension of clay containing in solution a water-soluble glass containing a phosphate radical, an alkali metal, in compounded form, and a normally solid element, in compounded form, other than phosphorus, of groups 2-8 of the periodic system having a normally solid oxide, the alkali metal and the phosphorus being present in the glass in a molecular ratio of 1—1.

12. A drilling mud comprising a suspension of clay containing in solution a water-soluble glass resulting from fusing an alkali metal phosphate and an oxygen-containing compound of a normally solid element, other than phosphorus, of groups 2-8 of the periodic system, having a normally solid acid oxide, and rapidly chilling the melt.

13. A drilling mud comprising a suspension of clay containing in solution a water-soluble glass comprising an alkali metal hexametaphosphate, homogeneously associated with an oxygen-containing compound of a normally solid element, other than phosphorus, of groups 2-8 of the periodic system having a normally solid oxide.

14. A method according to claim 1 in which the element of groups 2-8 of the periodic system is silicon.

15. A method according to claim 1 in which the element of groups 2-8 of the periodic system is chromium.

16. A method according to claim 1 in which the element of groups 2-8 of the periodic system is vanadium.

17. A method according to claim 6 in which the element of groups 2-8 of the periodic system is silicon.

18. A method according to claim 6 in which the element of groups 2-8 of the periodic system is chromium.

19. A method according to claim 6 in which the element of groups 2-8 of the periodic system is vanadium.

20. A method according to claim 7 in which the element of groups 2-8 of the periodic system is silicon.

21. A method according to claim 7 in which the element of groups 2-8 of the periodic system is chromium.

22. A method according to claim 7 in which the element of groups 2-8 of the periodic system is vanadium.

23. A product according to claim 13 in which the element of groups 2-8 of the periodic system is silicon.

24. A product according to claim 13 in which the element of groups 2-8 of the periodic system is chromium.

25. A product according to claim 13 in which the element of groups 2-8 of the periodic system is vanadium.

MILTON WILLIAMS.